(12) United States Patent
Denton et al.

(10) Patent No.: US 12,103,894 B2
(45) Date of Patent: Oct. 1, 2024

(54) POLYMER MASONRY UNIT AND METHOD THEREFOR

(71) Applicant: Lithic Industries Holding Co., Florence, TX (US)

(72) Inventors: Todd Denton, Temple, TX (US); Michael Doty, Academy, TX (US); Griffith J. Williams, Star, ID (US); Samuel Lopez, Abilene, TX (US); Kameron Anthony Hill, Brazoria, TX (US); Jonathan Ross, Abilene, TX (US); Dyllon Hagan, Fort Worth, TX (US); Timothy James Kennedy, Abilene, TX (US)

(73) Assignee: Lithic Industries Holding Co., Florence, TX (US)

( * ) Notice: Subject to any disclaimer, the term of this patent is extended or adjusted under 35 U.S.C. 154(b) by 0 days.

(21) Appl. No.: 17/409,952

(22) Filed: Aug. 24, 2021

(65) Prior Publication Data
US 2022/0064068 A1    Mar. 3, 2022

Related U.S. Application Data

(60) Provisional application No. 63/073,243, filed on Sep. 1, 2020.

(51) Int. Cl.
*C04B 26/04* (2006.01)
*B28B 1/14* (2006.01)
(Continued)

(52) U.S. Cl.
CPC .............. *C04B 26/045* (2013.01); *B28B 1/14* (2013.01); *C04B 14/28* (2013.01); *C04B 41/009* (2013.01); *C04B 41/5022* (2013.01); *C04B 41/65* (2013.01)

(58) Field of Classification Search
CPC ... C04B 26/045; C04B 14/28; C04B 41/5022; C04B 41/65; C04B 41/009; B28B 1/14
See application file for complete search history.

(56) References Cited

U.S. PATENT DOCUMENTS

| | | | |
|---|---|---|---|
| 5,802,796 A | | 9/1998 | McClinton et al. |
| 6,264,740 B1 | * | 7/2001 | McNulty, Jr. ........... C04B 28/00 106/815 |

(Continued)

FOREIGN PATENT DOCUMENTS

| | | | |
|---|---|---|---|
| CN | 101781105 A | * 7/2010 | ............ C04B 28/10 |
| WO | 2008128287 A1 | 10/2008 | |
| WO | 2019112555 A1 | 6/2019 | |

OTHER PUBLICATIONS

Beatite 30 Data Sheet. Onyx Marbres Granules. Pages 1-2 (Year: 2003).*

(Continued)

*Primary Examiner* — John E Uselding
(74) *Attorney, Agent, or Firm* — Whitaker Chalk Swindle & Schwartz PLLC; Enrique Sanchez, Jr.; Juan Vasquez

(57) ABSTRACT

A polymer masonry unit is disclosed that can include a polymer added to a quarry byproduct to manufacture a quality brick unit. The present disclosure solves the technological problem of providing a structurally sound brick or concrete alternative without the need for kiln firing, using traditionally unusable waste material. By combining quarry byproduct and a polymer, a polymer masonry unit can be fabricated having compressive strength and architectural utility. In one exemplary embodiment, fiber elements can be added to the byproduct and polymer mixture to increase structural stability. The present disclosure improves the performance of the system itself by providing a basic block or brick unit using an environmentally responsible manufacturing process that reduces cost and waste. The manu- (Continued)

facturing process includes a polymer/base material that can be poured into molds that cures over a predetermined period, without the need for kiln firing.

13 Claims, 6 Drawing Sheets

(51) Int. Cl.
    *C04B 14/28*     (2006.01)
    *C04B 41/00*     (2006.01)
    *C04B 41/50*     (2006.01)
    *C04B 41/65*     (2006.01)

(56) References Cited

U.S. PATENT DOCUMENTS

| | | | |
|---|---|---|---|
| 6,294,179 B1* | 9/2001 | Lee | A61Q 19/10 510/109 |
| 2004/0121082 A1 | 6/2004 | Dunnous et al. | |
| 2005/0087908 A1 | 4/2005 | Nasr et al. | |
| 2006/0191232 A1 | 8/2006 | Salazar et al. | |
| 2013/0210963 A1* | 8/2013 | Dantin | C04B 26/04 524/5 |
| 2016/0002867 A1 | 1/2016 | Hauza | |

OTHER PUBLICATIONS

Baghini et al. "Effect of styrene-butadiene copolymer latex on properties and durability of road base stabilized with Portland cement additive" Jun. 29, 2014 Construction and Building Materials pp. 740-749.

Maksimov et al. "Mechanical Properties of Polyester Polymer-Concrete" Mechanics of Composite Material, vol. 35, No. 2, pp. 99-110, 1999.

Dan et al. "Effects of aggregate type and SBS copolymer on the interfacial heat transport ability of asphalt mixture using molecular dynamics simulation" Apr. 2, 2020, Construction and Building Materials, pp. 1-12.

PCT International Patent Appl. No. PCT/US21/71290, international filing date Aug. 26, 2021, International Search Report and Written Opinion, Jan. 6, 2022, 7 pgs.

* cited by examiner

POLYMER MASONRY UNIT AND METHOD THEREFOR

CROSS-REFERENCE TO RELATED APPLICATIONS

The present application claims priority to U.S. Prov. App. Ser. No. 63/073,243 filed on Sep. 1, 2020, the entirety of which is incorporated herein by reference.

TECHNICAL FIELD

The present disclosure generally relates to composite materials, and more specifically to composite material including a rock base material and a polymer.

BACKGROUND

Construction of civil infrastructure requires many types of different components. Stone, brick, steel, and concrete are just a few types of materials found in a given edifice. The masonry-related elements (e.g., stone, brick, and concrete) are widely utilized for their comparatively low cost and high compression strength, allowing them to bear heavy loads and form foundations, floors, walls, columns, etc. Each of these masonry-related elements is obtained in a different way. For example, bricks are generally molded into rectangular cubes and then fired; concrete is generally a mixture of gravel or sand and cement which can harden when left stationary; and stone is mined, such as at rock quarry locations.

With respect to bricks, traditional methods of brick creation suffer from many disadvantages that exacerbate environmental problems by adding to carbon emissions or creating structurally inferior products. Modern, fired, clay bricks are formed in one of three processes—soft mud, dry press, or extruded. Depending on the country, either the extruded or soft mud method is the most common, since they are the most economical. Fired bricks are the strongest, most durable bricks today; however, they must be burned in a kiln to make them durable. A kiln is typically used to fire bricks between 1,800 to 2,400 degrees Fahrenheit. In many modern brickworks, bricks are usually burned in a continuously-fired kiln, where the bricks are fired as they move slowly through the kiln on conveyors, rails, or kiln cars, which achieves a more consistent brick product. The bricks often have lime, ash, and organic matter added, which accelerates the burning process. Such process requires the added expense of kiln fabrication, fuel costs, and additives to accelerate burning. This kiln-firing process cooks the brick into a finished form, which makes it cure and draws out all of the liquid and all of the fluid that might be inside of it to harden the brick. Kiln-firing bricks is costly, as it requires some form of fuel to create the fire that generates the immense heat. Such process requires additional resources, such as natural gas, propane, coal, wood, or other suitable material, which must be purchased, stored, and consumed.

With respect to concrete, the manufacture and use of concrete also engenders a wide range of environmental and social consequences. For example, production of cement, the major component of concrete, is a leading cause of carbon dioxide emissions; the cement industry is one of the three primary producers of carbon dioxide. This is largely due to the need to sinter, e.g., limestone and clay at around 2,700 to 2,800 degrees Fahrenheit—every ton of cement produced releases one ton of carbon dioxide into the atmosphere. Concrete additionally contributes significantly to the urban heat island effect, and production of concrete masonry units also generates other harmful byproduct that can cause health concerns due to toxicity and radioactivity.

With respect to stone, while avoiding many of the issues associated with brick and concrete (i.e., kiln firing, significant carbon emissions from production, etc.), stone must generally be mined from the ground, such as at a rock quarry, and mining stone can be strenuous and wasteful. A rock quarry is a type of open-pit mine in which stone, rock, or aggregate can be excavated from the ground. Many quarry stones such as marble, granite, limestone, and sandstone are cut into larger slabs and removed from the quarry. As slabs are cut from the quarry, waste is produced. The production process for dimensional limestone produces an estimated 38% waste—material that does not meet job size and specifications. This "waste" continues to accumulate daily and represents a sunk cost for the parent company raw material procurement. In the simplest terms, the stone ledge is exposed by removing the overburden or dirt on top of the stone ledge. During the first phase, a production saw cuts the ledge to create stone blocks. As the saw cuts the stone ledge, waste product is generated. Then, in the second phase, the blocks are processed into usable stone billets which are cut or processed into multiple slabs, where waste product is again generated. The stone slabs are then transported to another production area platform, where the finished good is fabricated; that process again generates additional waste product. Quarry byproducts are further produced in crushing and washing operations during processing of crushed stone for use as construction aggregate. Three types of quarry byproducts resulting from these operations include screenings, pond fines, and baghouse fines.

"Screenings" is a generic term used to designate the finer fraction of crushed stone that accumulates after primary and secondary crushing and separation on a 4.75 mm (No. 4) sieve. The size distribution, particle shape, and other physical properties can be somewhat different from one quarry location to another, depending on the geological source of the rock quarried, the crushing equipment used, and the method used for coarse aggregate separation. Screenings generally contain freshly fractured faces, have a fairly uniform gradation, and do not usually contain large quantities of plastic fines.

Pond fines refer to the fines obtained from the washing of a crushed stone aggregate. During production, the coarser size range (greater than No. 30 sieve) from washing may be recovered by means of a sand screw classifier. The remainder of the fines in the overflow are discharged to a series of sequential settling ponds or basins, where they settle by gravity, sometimes with the help of flocculating polymers. Pond clay is a term usually used to describe waste fines derived from the washing of natural sand and gravel.

Some quarries operate as dry plants because of dry climatic conditions or a lack of market for washed aggregate products. Dry plant operation requires the use of dust collection systems, such as cyclones and baghouses, to capture dusts generated during crushing operations. These dusts are referred to as baghouse fines.

It is estimated that at least 159 million metric tons (175 million tons) of quarry byproducts continue to be generated each year, mostly from crushed stone production operations. As much as 3.6 billion metric tons (4 billion tons) of quarry byproducts have probably accumulated. Currently, the only options for handling byproduct are to continue piling the byproduct into a mountain or crush it for use as crushed aggregate product. While quarry byproduct has historically been utilized by the industry to produce aggregate material, the primary endpoint has been road construction. Specifically, with respect to the fabrication of limestone, such processing creates a fair amount of waste that has very limited application—limestone-based aggregate is typically not hard enough or dense enough to use for roadway base as a stand-alone material. For example, the Texas Department of Transportation (TXDOT) standards require aggregate to be a grade 1 or 2 specification for major thoroughfares, and limestone-based aggregate produced from most Texas limestone generally grades at TXDOT specification 3 or 4, which is too soft for major thoroughfares and generally only acceptable for, e.g., county roads and foundation base. From a byproduct recycling standpoint, however, the foundation base of choice in many markets does not utilize the limestone aggregate, as a general rule.

The exact quantity of quarry byproducts that are being recycled is not known. Very little of the 159 million metric tons (175 million ton) produced annually is thought to be used, especially the pond fines. In a recent survey, three states (Arizona, Illinois, and Missouri) indicated that quarry byproducts have been used as an embankment material and three other states (Florida, Georgia, and Vermont) indicated some use of quarry byproducts in base or subbase applications. Some use has been made of limestone screenings as agricultural limestone, and baghouse fines from quarry sources have been used as mineral filler in asphalt paving. However, virtually all of the quarry byproducts generated are disposed of at the quarry source—screenings are stockpiled in a dry or damp form; pond fines are conveyed in slurry form to settling ponds; baghouse fines are usually sluiced into settling ponds.

SUMMARY

The present disclosure achieves technical advantages as a Polymer Masonry Unit (PMU) that can include a polymer added to a quarry byproduct, such as a limestone aggregate, to manufacture a quality brick unit. In one embodiment, the present disclosure can avoid a kiln-firing process, which is costly, creates waste, and consumes significant energy. In another embodiment, the present disclosure can avoid the use of cement in forming construction units. In another embodiment, the present disclosure can utilize a mold infusion method that advantageously does not waste those resources or add the expense of those resources and does not create a larger carbon footprint by burning and smoke expulsion.

The present disclosure solves the technological problem of providing a structurally sound brick or concrete alternative without the need for kiln firing, using traditionally unusable waste material. By combining quarry byproduct and a polymer, a polymer masonry unit can be fabricated having compressive strength and architectural utility. In one exemplary embodiment, fiber elements can be added to the byproduct and polymer mixture to increase structural stability. Fiber elements can include hemp, glass, sand, cotton stalks or other plant fibers.

The present disclosure improves the performance of the system itself by providing a basic block or brick unit using an environmentally responsible manufacturing process that reduces cost and waste. In one embodiment, the manufacturing process includes a polymer/base material that can be poured into molds that cures over a predetermined period, without the need for kiln firing. In another embodiment, by using quarry byproduct to fabricate polymer masonry units, the manufacturing of the polymer masonry unit can be environmentally benign, as quarry byproduct generally does not contain any elements that would be harmful to the environment.

The present disclosure offers significant advantages over traditional concrete and other building unit components. For example, a polymer masonry unit in accordance with the present disclosure can be fabricated without application of a heat source. In another example, a polymer masonry unit mixture (e.g., a slurry that can be molded and/or dried, such as to make a polymer masonry unit), can have broad applicability. For example, polymer masonry unit mixture can be formed in molds to create face brick replacement blocks, poured as a concrete replacement, roadway material replacement, sculpture base, or other suitable material replacement. In one exemplary embodiment, given the consistency of the mixture, the mixture can be used in 3-D printing applications where this mixture is operably coupled to a computer having a raster or vector file that can control the positioning and operation of a nozzle/aperture device that can deliver precise quantities of the mixture to precise locations. The location of the nozzle/aperture device can be operably coupled to a mechanical positioning system, such as a track and servo motor frame, and controlled by the computer. The mixture can then be cured into the final piece.

In one embodiment, the present disclosure can include a specifically-formulated mixture that can yield a polymer brick unit that can, in one embodiment, serve as a replacement for bricks or concrete. For example, a polymer masonry unit in accordance with the present disclosure can have significant compression strength, such that it can arise to or exceed ASTM standards. In another embodiment, a polymer masonry unit composition can require a specific amount and/or range of polymer to achieve desired qualities. For example, it has been observed that a specific amount of polymer must be used, or the polymer masonry unit could be unstable, brittle, or un-settleable. In one embodiment, a polymer masonry unit mixture comprising greater than, e.g., 10% by weight of polymer has been observed to yield a polymer masonry unit with compromised structural integrity, such that the polymer masonry unit mixture cannot retain a shape of a modular brick mold. In another embodiment, a polymer masonry unit mixture comprising less than 1% by weight of polymer can yield a polymer masonry unit that is unable to withstand compression forces, such that the polymer masonry unit cannot be a suitable construction material.

In another embodiment, polymer masonry unit mixture can be thick but malleable, and wet and formable so it can be manipulated. In another embodiment, the manipulation period can be limited, such as once it begins to cure and harden. In one exemplary embodiment, the cure time can be within 24 hours. In one exemplary embodiment, the cure time can be between 48 hours to 72 hours. In one embodiment, and such as can be due to the fluid nature of the mixture, the mixture can also be sprayed. In one exemplary embodiment, the mixture can be sprayed onto the surface of a house. In another exemplary embodiment, color can be added to the mixture. For example, color can be added to the mixture during the mixing process and the colored mixture can be sprayed onto a surface. Alternatively, polymer masonry units can be traditionally painted and/or sealed. In another embodiment, another benefit of the polymer masonry unit is the R-rating of the material. The heat absorption and radiation properties of brick and concrete are significantly greater than those of the polymer masonry unit.

In one embodiment, the present disclosure can include a method of forming a polymer masonry unit, the method comprising the steps of: determining a unit size; determining an amount of rock base material; determining a target moisture content; determining a target polymer content; calculating a predicted wet mixture weight; determining, using the target moisture content, the predicted wet mixture weight, and the target polymer content, an amount of polymer and an amount of water; mixing the amount of rock base material, the amount of water, and the amount of polymer together to form a unit mixture having a wet mixture weight; applying the unit mixture to a mold; and drying the unit mixture, wherein the amount of polymer comprises 1-10% of the wet mixture weight, wherein the amount of aggregate comprises 80-90% of the wet mixture weight, wherein the amount of water comprises 1-10% of the wet mixture weight. In another embodiment, the target moisture content can range from 8-20% of the wet mixture weight.

In another embodiment, the present disclosure can include a method of forming a polymer masonry unit, the method comprising the steps of: mixing together a rock base material, a polymer, and water to form a mixture having a wet mixture weight; pouring the mixture into a mold; and drying the mixture, wherein the polymer is a styrene-butadiene-based polymer, wherein the polymer comprises 1-10% of the wet mixture weight. In one embodiment, the rock base material can be a calcium carbonate aggregate. In another embodiment, the rock base material can comprise 80-90% of the wet mixture weight. In another embodiment, the water can comprise 1-10% of the wet mixture weight. In another embodiment, the mixture can be dried without a heat source. In another embodiment, the mixture can be dried with an oven. For example, the oven drying can be at a drying temperature between 120-180 degrees, or other suitable range. In another embodiment, the method can further comprise the step of applying a glaze to the mixture. For example, the glaze can be applied to the mixture to decrease environmental water absorption. In another embodiment, the mixture can have a moisture content from 8-20% of the wet mixture weight. In another embodiment, the method can further comprise the step of creating a void in the mixture. For example, the void can be shaped and sized to provide an aesthetic or functional effect suited to a specific application.

In another embodiment, the present disclosure can include a polymer masonry unit comprising a polymer and a quarry byproduct, wherein the polymer comprises 1-10% of a weight of the unit, and the quarry byproduct comprises 90-99% of the weight of the unit. In another embodiment, the quarry byproduct can be calcium carbonate aggregate. In another embodiment, the polymer can be an acrylic copolymer-based polymer. In another embodiment, the polymer can be a styrene-butadiene-based polymer. In another embodiment, 5-15% of the quarry byproduct can have a particle size of at least 4750 microns. In another embodiment, 10-20% of the quarry byproduct can have a particle size ranging from 2360 microns to 4750 microns. In another embodiment, 25-35% of the quarry byproduct can have a particle size ranging from 600 microns to 2360 microns. In another embodiment, 30-40% of the quarry byproduct can have a particle size ranging from 150 microns to 600 microns. In another embodiment, 1-10% of the quarry byproduct can have a particle size ranging from 75 microns to 150 microns.

BRIEF DESCRIPTION OF THE DRAWINGS

The present disclosure will be readily understood by the following detailed description, taken in conjunction with the accompanying drawings that illustrate, by way of example, the principles of the present disclosure. The drawings illustrate the design and utility of one or more exemplary embodiments of the present disclosure, in which like elements are referred to by like reference numbers or symbols. The objects and elements in the drawings are not necessarily drawn to scale, proportion, or precise positional relationship. Instead, emphasis is focused on illustrating the principles of the present disclosure.

DETAILED DESCRIPTION

Figure 1:
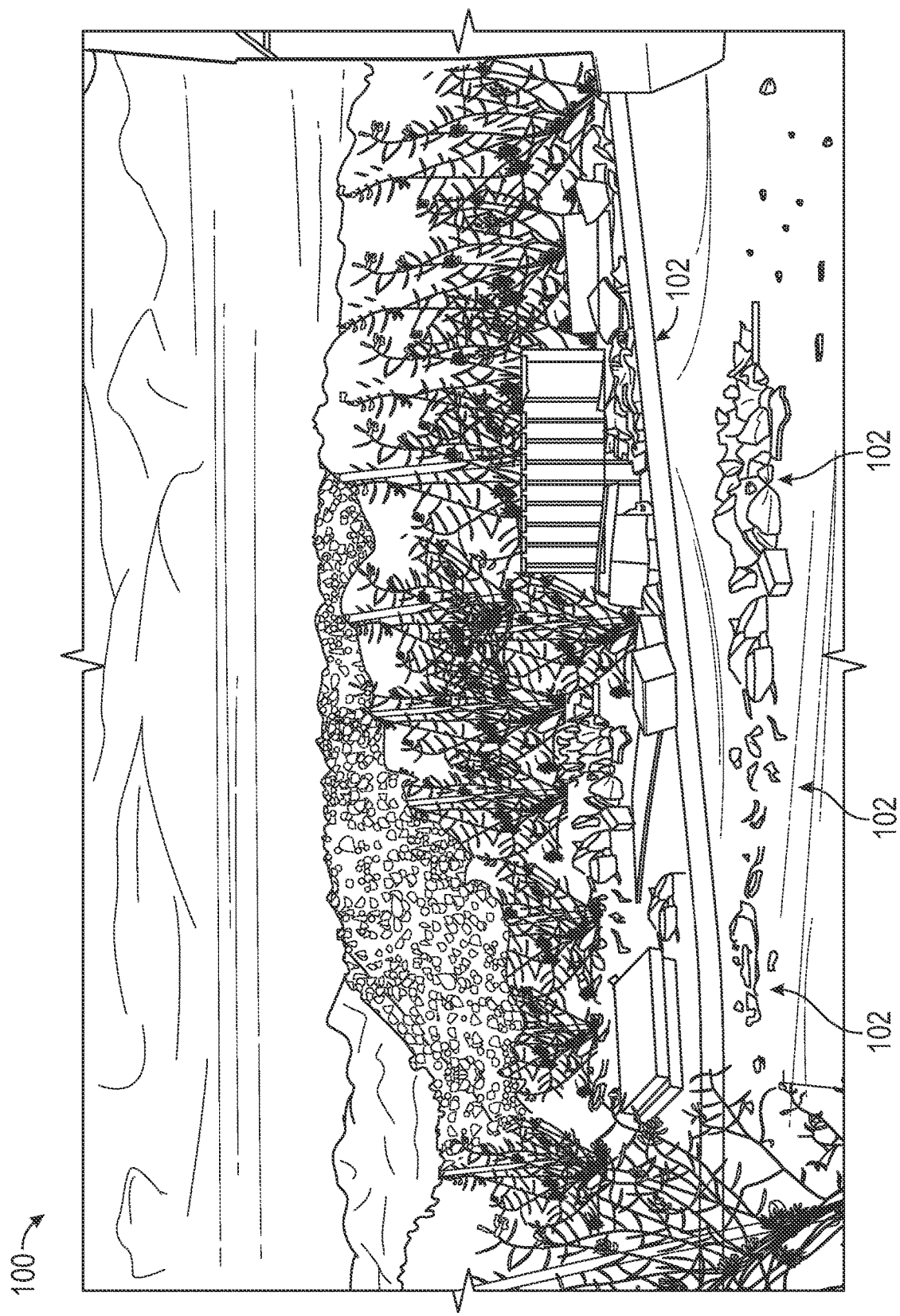
FIG. 1 illustrates a perspective view of an exemplary stone quarry, in accordance with one or more exemplary embodiments of the present disclosure.

The present disclosure will be readily understood by the following detailed description, taken in conjunction with the accompanying drawings that illustrate, by way of example, the principles of the present disclosure. The drawings illustrate the design and utility of one or more exemplary embodiments of the present disclosure, in which like elements are referred to by like reference numbers or symbols. The objects and elements in the drawings are not necessarily drawn to scale, proportion, or precise positional relationship. Instead, emphasis is focused on illustrating the principles of the present disclosure.

FIG. 1 illustrates a perspective view of an exemplary stone quarry 100 in accordance with one or more embodiments of the present disclosure. Significant quarry byproduct (rock base material) (stone quarry byproduct) (aggregate) (stone quarry aggregate) 102 can be generated, such as during crushing and washing operations. In one embodiment, there can be three types of quarry byproducts resulting from these operations: screenings, pond fines, and baghouse fines. In another embodiment, the quarry byproduct 102 generated from these operations can be similar in concept to sawdust but can include fine dust and small stone fragments. In another embodiment, quarry byproduct 102 can also be generated by hydraulically splitting the stone billet or chipping it to fabricate the finished goods. In another embodiment, quarry byproduct 102 can take the form of remnants of larger waste material that cannot be used in a given project. In one embodiment, such quarry byproduct 102 can be mixed with a polymer and/or for fabricating a polymer masonry unit. In another embodiment, the quarry byproduct 102 can be filtered to remove excessively large stone fragments. In one exemplary embodiment, the quarry byproduct 102 can be calcium carbonate (calcium carbonate aggregate). In one embodiment, the quarry byproduct 102 can limestone byproduct. In one exemplary embodiment, the byproduct can be limestone. In one embodiment, quarry byproduct 102 (e.g., limestone byproduct) can be 40 parts per million calcium, which makes it 100% calcium carbonate. In one embodiment, the molecular composition and/or calcium content can be important—for example, 100% calcium carbonate can be considered a pure element that is less susceptible to degradation. In one embodiment, calcium carbonate can have the same characteristics as the limestone slab. In another embodiment, quarry byproduct 102 can be any stone quarry byproduct, rock dust, stone fragments, or other suitable rock-based byproduct.

In another exemplary embodiment, saws (e.g., Vermeer saws) can actively mine surface rock at a stone quarry 100 into blocks used for production. In one embodiment, these blocks can then be fabricated with additional saws (e.g., Cobra saws) that can transform blocks into slabs of different heights, such as from 1" to 16". In another embodiment, these slabs can then be introduced into the finishing stages where they are refined into chopped stone or sawed stone. In another embodiment, these finished goods can then be marketed and sold as smooth or chopped stone in full veneer with a thickness ranging from, e.g., 3-5" in width to accommodate a brick ledge used in commercial and residential construction. In another embodiment, these same blocks can be used as thin veneer applications ranging in thickness from, e.g., 1-1.5" and used in commercial and residential construction. In one example, stone quarry processes can generate an average of 38% waste depending on the process and application employed to produce the finished product.

Figure 2:
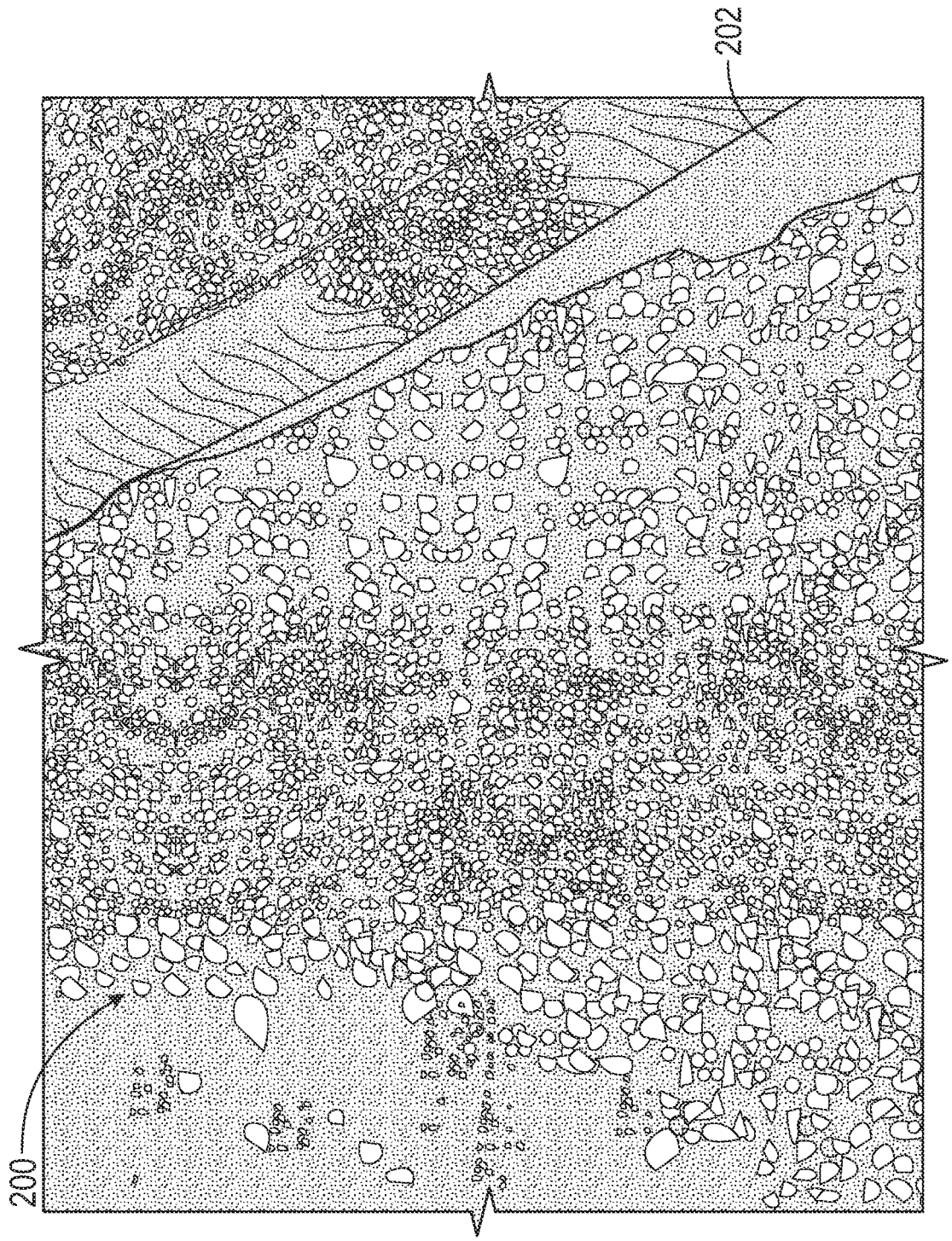
FIG. 2 illustrates a perspective view of a quarry byproduct mound, in accordance with one or more exemplary embodiments of the present disclosure.

FIG. 2 illustrates a perspective view of a quarry byproduct mound 200 at a rock quarry, in accordance with one or more exemplary embodiments of the present disclosure. In one embodiment, the quarry byproduct can be limestone byproduct that can be typically collected by piling it into a mound. In one embodiment, the mound can continue to grow as quarry operations continue. In another embodiment, once it rains, the excess can set and harden. In another embodiment, quarry byproduct can be formed during sawing of a rock shelf, which can form a crevasse or trail, such as saw trail 202. Generally, the aggregate 200 can accumulate at these areas.

Figure 3:
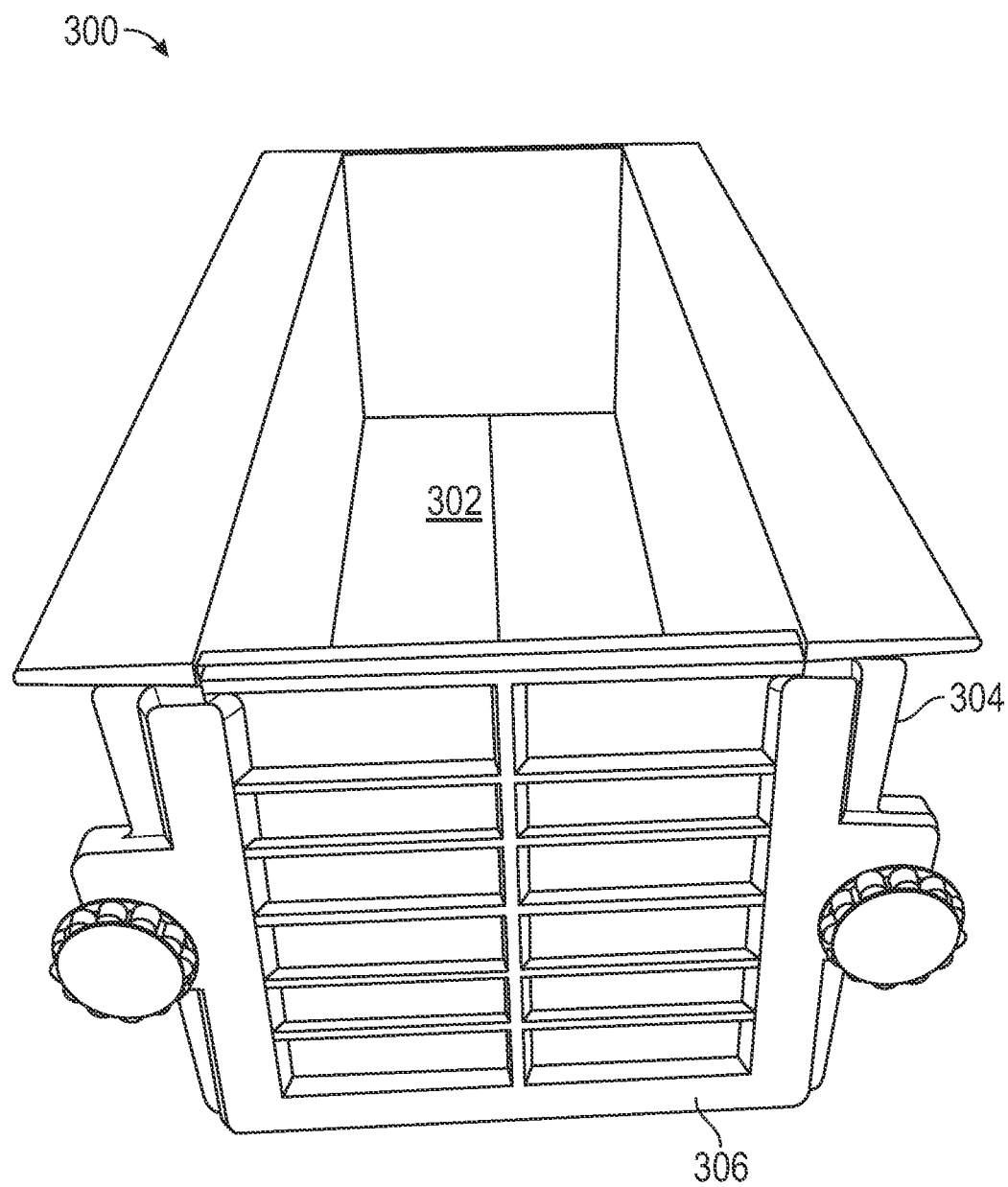
FIG. 3 illustrates a perspective view of a polymer masonry unit mold, in accordance with one or more exemplary embodiments of the present disclosure.

FIG. 3 illustrates a perspective view of a polymer masonry unit mold, in accordance with one or more exemplary embodiments of the present disclosure. In one embodiment, the mold 300 can include a receptacle 302 and a frame 304. In another embodiment, the mold 300 can include a door 306 or other access point, such as to facilitate the removal of a polymer masonry unit from the mold 300. In another embodiment, mixing quarry byproduct with a polymer and water can create a mixture that can be poured into the mold 300, or into any other suitable mold. In one embodiment, the ingredients can be mixed until reaching the consistency of a paste, (e.g., using a hand drill and a mixing attachment or other suitable mixing process). In another embodiment, the mold 300, receptacle, 302, and/or frame 304 can be of any shape and can have ornamentation that can be impressed or embossed into the mixture. In one embodiment, the mold 300 can be made of metal, plastic, or other suitable material.

Figure 4:
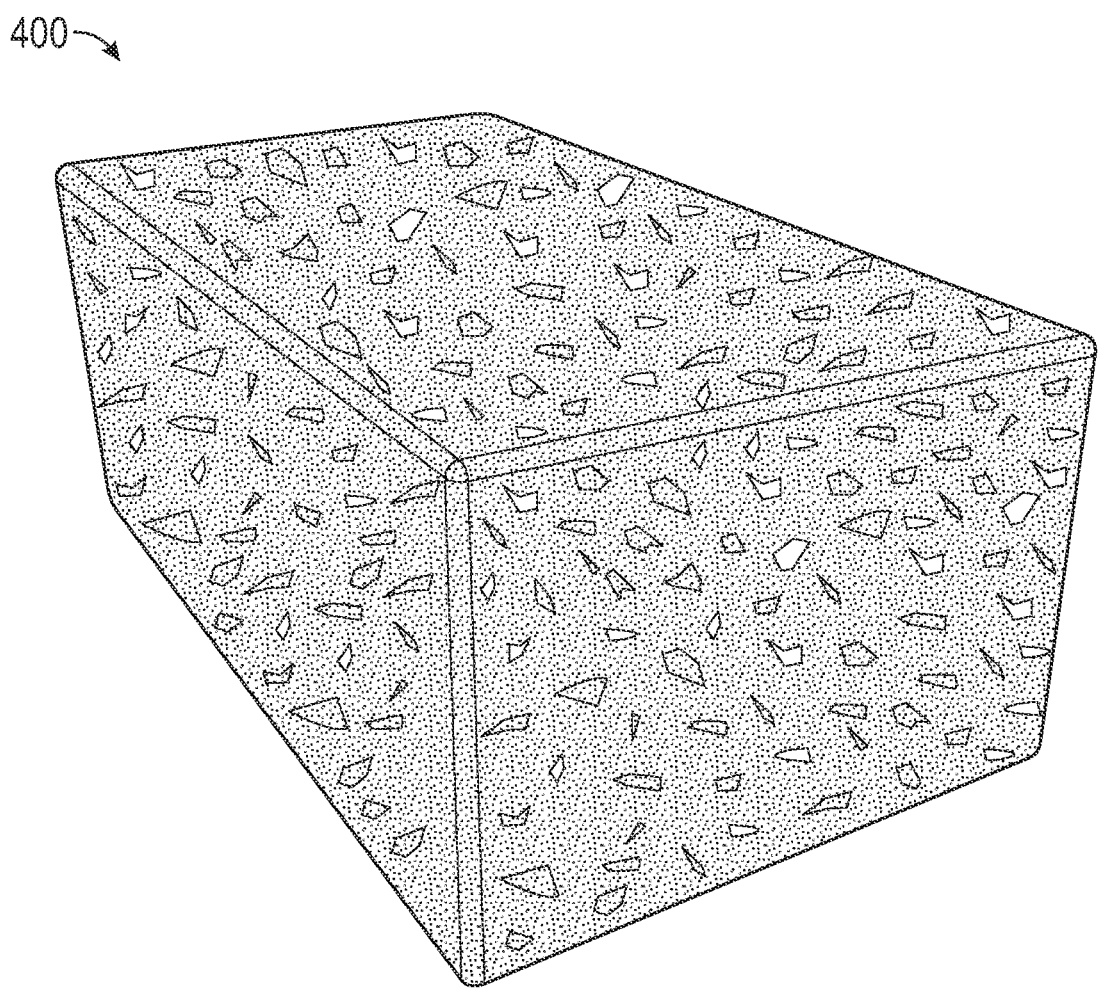
FIG. 4 illustrates a perspective view of a polymer masonry unit, in accordance with one or more exemplary embodiments of the present disclosure.

FIG. 4 illustrates a perspective view of a polymer masonry unit 400, in accordance with one or more exemplary embodiments of the present disclosure. In one exemplary embodiment, the polymer masonry unit 400 can include: quarry byproduct (e.g., 34 lbs. of limestone) mixed with a polymer (e.g., 1.2 ounces of an acrylic copolymer-based polymer) and water (e.g., 8 ounces). In another exemplary embodiment, the quarry byproduct can comprise granite, clay, gypsum, marble, slate, or other suitable rock. In another exemplary embodiment, the polymer can comprise any natural or synthetic polymer. In another exemplary embodiment, the paste can then be poured into a mold of approximate size 3"×3"×9" up to 6"×6"×24" (or other suitable dimensions) and allowed to cure for a predetermined time period (e.g., 24 hours), without the application of any heat. In another exemplary embodiment, the paste can be fully cured in 48 hours and a polymer masonry unit 400 (block or brick) can be extracted from the mold. In another embodiment, the polymer masonry unit 400 can be cured with a heat source, such as an oven. In another exemplary embodiment, the fabrication methods of cutting, splitting, and/or sanding can be applied to the polymer masonry unit. In another embodiment, and advantageously, the characteristics and structural stability of the polymer masonry unit 400 can match those of natural limestone.

In one embodiment, the polymer masonry unit 400 can be structurally stable. In one exemplary embodiment, the polymer masonry unit can meet or exceed the ASTM standard for structural stability. In another example, polymer masonry unit 400 can meet or exceed the ASTM standards for structural stability in regard to density in water absorption and specific gravity and compressive strength, among others. In another embodiment, the polymer masonry unit 400 mixture can be an alternative to concrete. In another embodiment, when the polymer masonry unit 400 gets radiated, there can be no emissions, in contrast to concrete.

In one exemplary embodiment, the polymer masonry unit 400 can have the look and feel of limestone. In another embodiment, the polymer masonry unit 400 can be sawed, hydraulically split with pressure, or cut by any other suitable mechanism. In another embodiment, the polymer masonry unit 400 can be finished applying a coat of a polymer (such as the same polymer that helps form the unit 400) on the surface of the polymer masonry unit, such as to seal the polymer masonry unit, and/or to minimize any powder or residue of the polymer masonry unit 400. In another embodiment, the polymer masonry unit 400 can be glazed, such as with ceramic, polymer, or any other suitable material. In another embodiment, voids (cores) can be disposed within the polymer masonry unit 400, such as to modify a weight of the polymer masonry unit 400.

In another embodiment, the polymer masonry unit 400 can comprise certain amounts of rock base material, polymer, and water. For example, a polymer masonry unit 400 can comprise 1-10% polymer by weight. In another embodiment, a polymer masonry unit 400 can comprise 5-8% polymer by weight. In another embodiment, a polymer masonry unit 400 can comprise less than 10% polymer by weight. In another embodiment, a polymer masonry unit 400 can comprise more than 3% polymer by weight. In another embodiment, the polymer masonry unit can comprise 90% rock base material by weight. In another embodiment, the polymer masonry unit can comprise 90-91.5% rock base material by weight. In another embodiment, the polymer masonry unit can comprise 91-92% rock base material by weight. In another embodiment, the polymer masonry unit can comprise 92-94% rock base material by weight.

In another embodiment, quarry byproduct like that used in the polymer masonry unit 400 can have a particular liquid limit, a particular plastic limit, and/or a particular plasticity index. For example, the quarry byproduct can have a liquid limit from 15-25%. In another embodiment, the quarry byproduct can have a plastic limit of 10-20%. In another embodiment, the quarry byproduct can have a plasticity index of 1-10%. In another embodiment, quarry byproduct can have any liquid limit, plastic limit, and/plasticity index such that the quarry byproduct is suitable to be utilized in a polymer masonry unit. In another embodiment, quarry byproduct can include any other sort of measurable index, including liquidity index, consistency index, flow index, toughness index, activity, or any other index, measurement, or constant associate with aggregate, soil, or any other particulate matter. In another embodiment, the polymer can be, e.g., T-PRO 500® by Terratech Inc. In another embodiment, the polymer can be a water-based emulsion of acrylic copolymer designed specifically for stabilization and dust suppression for a variety of soil types. In another embodiment, the polymer can be eco-safe, non-toxic, and specifically formulated to interact with soil chemistry and create high strength, durable, water resistant bonds.

Figure 5:
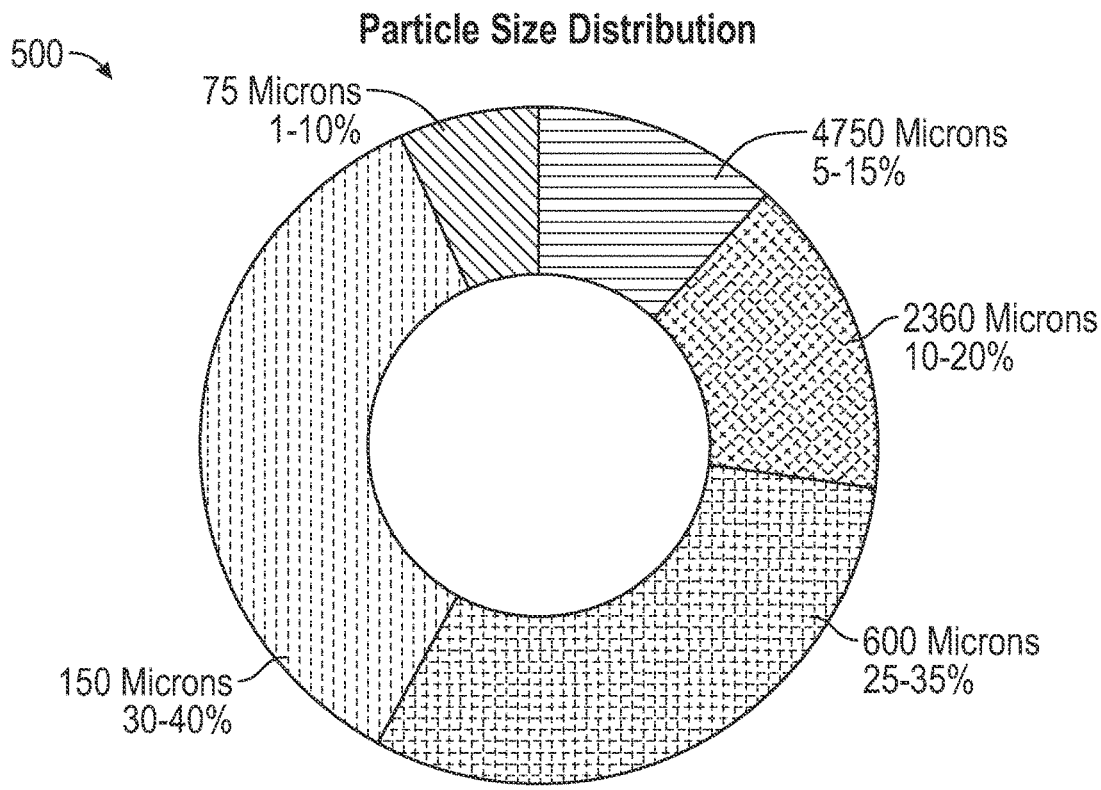
FIG. 5 illustrates an exemplary byproduct particle size distribution, in accordance with one or more exemplary embodiments of the present disclosure.

FIG. 5 depicts another embodiment of the present disclosure. In one embodiment, rock base material can include particles of several different sizes. For example, a quarry byproduct particle size distribution 500 can include particles of 4750 microns and larger, particles of 2360 microns to 4750 microns, particles of 600 microns to 2360 microns, particles from 150 microns to 600 microns, particles from 75 microns to 150 microns, particles from 53 microns to 75 microns, and/or particles smaller than 53 microns. In another embodiment, 5-15% by weight of particles of a rock base material can include particles of 4750 microns and larger. In another embodiment, 10-20% by weight of particles of a rock base material can include particles of 2360 microns to 4750 microns. In another embodiment, 25-35% by weight of particles of a rock base material can include particles of 600 microns to 2360 microns. In another embodiment, 30-40% by weight of particles of a rock base material can include particles from 150 microns to 600 microns. In another embodiment, 1-10% by weight of particles of a rock base material can include particles from 75 microns to 150 microns. In another embodiment, 0-1% by weight of particles of a rock base material can include particles from 53 microns to 75 microns. In another embodiment, 0-1% by weight of particles of a rock base material can include and/or particles smaller than 53 microns.

Figure 6:
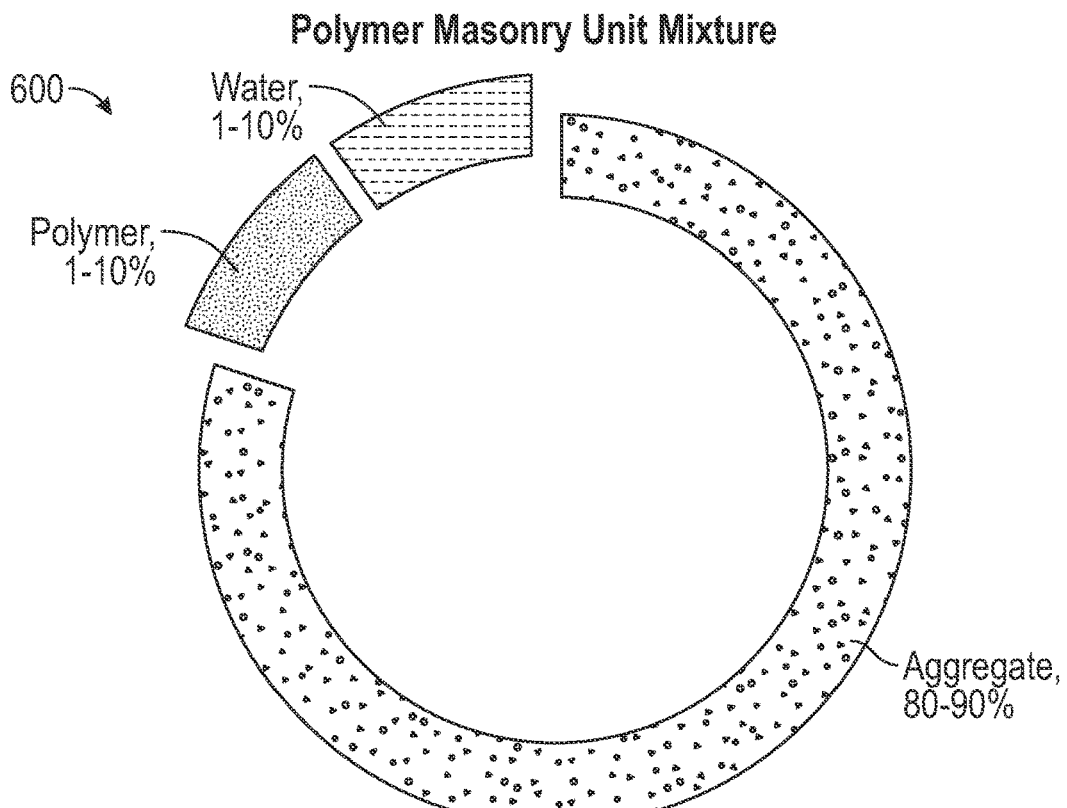
FIG. 6 illustrates an exemplary polymer masonry unit mixture composition distribution, in accordance with one or more exemplary embodiments of the present disclosure.

FIG. 6 depicts another embodiment of the present disclosure. A composition of a polymer masonry unit can include aggregate, polymer, and water. In one embodiment, a polymer masonry unit slurry composition (polymer masonry unit mixture composition) 600 can be described by a content of materials included in a mixture (slurry) that can harden into a polymer masonry unit. For example, a polymer masonry unit slurry composition 600 can be described by the comparative weights of materials included in a mixture viewed as a percentage of the total weight of the un-hardened mixture. For example, a polymer masonry unit slurry can include 10% by weight of water, 10% by weight of polymer, and 80% by weight of aggregate when the slurry is initially mixed together. In one embodiment, as the slurry hardens, the weight ratios can change, such as due to evaporation, seepage, etc. In one embodiment, a polymer masonry unit can be referred to as, e.g., a "10%" unit, such as if a polymer masonry unit slurry included 10% by weight polymer.

In one embodiment, 2-8% of a weight of the polymer masonry unit slurry composition 600 can be polymer. In one embodiment, 3-7% of a weight of the polymer masonry unit slurry composition 600 can be polymer. In one embodiment, substantially 2.5-3.5% of a weight of the polymer masonry unit slurry composition 600 can be polymer. In one embodiment, substantially 3.5-4.5% of a weight of the polymer masonry unit slurry composition 600 can be polymer. In one embodiment, 5% of a weight of the polymer masonry unit slurry composition 600 can be polymer. In one embodiment, 5.5-6% of a weight of the polymer masonry unit slurry composition 600 can be polymer. In one embodiment, 6-7.5% of a weight of the polymer masonry unit slurry composition 600 can be polymer. In one embodiment, 7.5-8.8% of a weight of the polymer masonry unit slurry composition 600 can be polymer. In one embodiment, substantially 9% of a weight of the polymer masonry unit slurry composition 600 can be polymer. In one embodiment, substantially 10% of a weight of the polymer masonry unit slurry composition 600 can be polymer.

In another embodiment, the polymer masonry unit mixture composition 600 can include a moisture content. In one embodiment, the moisture content can refer to an amount of fluid within the mixture, such as compared to the totality of the mixture. In one embodiment, the moisture content can be measured as a percent weight of the total mixture weight. For example, the polymer masonry unit slurry composition 600 can have a moisture content ranging from 1-20%; in another example, this can refer to the weight of the mixture that can be accounted for by a fluid in the mixture. In another embodiment, the moisture content of the composition 600 can include water as fluid. In another embodiment, moisture content of the composition 600 can include a polymer as a fluid. In another embodiment, the moisture content of the composition 600 can include both water and a polymer as a fluid. For example, the amount of water and the amount of polymer in the composition 600 can be combined to account for a moisture content of the composition 600. In another example, if water comprises 4% of the composition 600 by weight, and the polymer comprises 10% of the composition 600 by weight, then the moisture content of the composition 600 can be, e.g., 14%.

In another embodiment, the moisture content of the composition 600 can be 1-5%. In another embodiment, the moisture content of the composition 600 can be 5-10%. In another embodiment, the moisture content of the composition 600 can be 10-15%. In another embodiment, the moisture content of the composition 600 can be 15-20%. In another embodiment, the moisture content 600 can be of any amount suitable to enable the compaction and/or molding of the composition 600, such as, e.g., into a polymer masonry unit. In another embodiment, the moisture content can correspond to an optimal moisture content of a particular aggregate, such as can be determined by, e.g., a Proctor compaction test. In another embodiment, a moisture content range can include an optimal moisture content of a particular aggregate, such as can be determined by, e.g., a Proctor compaction test.

Figure 7:
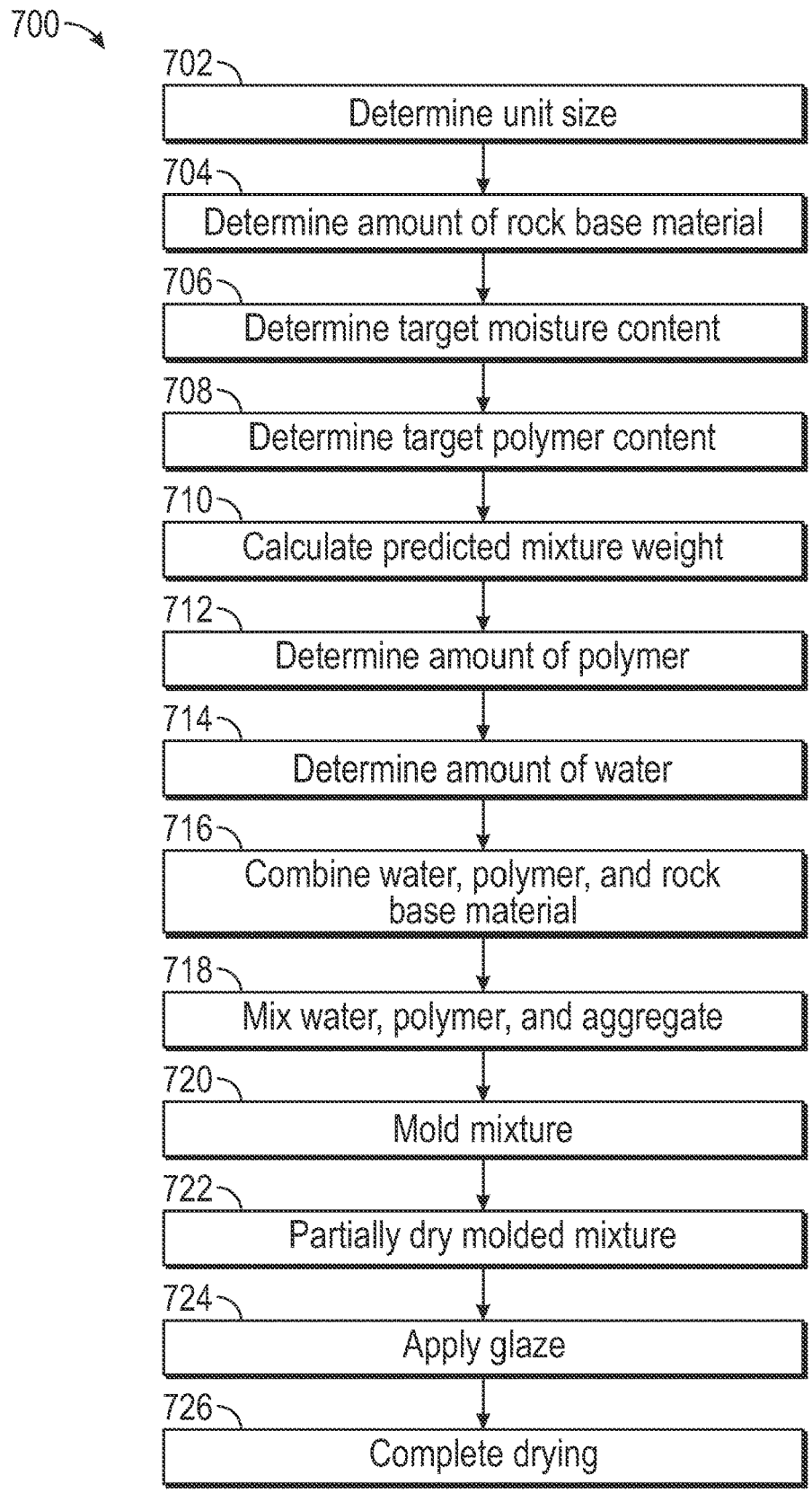
FIG. 7 illustrates and exemplary method of forming a polymer masonry unit, in accordance with one or more exemplary embodiments of the present disclosure.

FIG. 7 depicts another embodiment of the present disclosure. A method of forming a polymer masonry unit 700 can begin at step 702, where a unit size can be determined. For example, a polymer masonry unit can be of any suitable size for any suitable construction. In one embodiment, a unit can be 3⅝ inches by 2¼ inches by 7⅝ inches. In another embodiment, a unit can be 2¾ inches by 2¾ inches by 7⅝ inches. In another embodiment, a unit can be 2¾ inches by 2⅝ inches by 9⅝ inches. In one embodiment, a unit can take the form of a tile. In another embodiment, the unit can include any dimensions.

At step 704, In step 704, the amount of rock base material can be determined. In one embodiment, determining a unit size can assist in determining an amount of rock base material to be used. For example, a unit of a particular size can require a particular amount of rock base material. For example, a unit size of 3⅝ inches by 2¼ inches by 7⅝ inches can require 12.5 pounds of rock base material. In one embodiment, the rock base material can comprise the vast majority of the volume of a given unit, such as because the amount of water and/or polymer is comparatively small, and/or because the water and/or polymer can fill in spaces between rock base material particles such that the water and/or polymer does not substantially affect a volume and/or size of a mixture of rock base material, water, and polymer.

At step 706, a target moisture content can be determined. For example, a rock base material can have an optimal moisture content at which it will achieve a maximum dry density when compacted and dried. In one embodiment, a target moisture content can be from 8-20%, as calculated by dividing the weight of moisture by the total weight of rock base material with moisture in the rock base material. In another embodiment, the target moisture content can be from 12-16%. In another embodiment, the target moisture content can be in any range or amount that can facilitate the compaction and sufficient dry density of the rock base material.

At step 708, a target polymer content can be determined. For example, a unit and/or unit mixture can have varying degrees of polymer as compared to the rock base material and/or water that can lend distinct properties to a given unit. In one embodiment, including less polymer can lead to a more brittle unit. In another embodiment, using more polymer can lead to a more malleable unit. In one embodiment, a specific polymer content of a unit mixture and/or unit can provide optimal compression strength. In one embodiment, a target polymer content can be from 1-10% of a wet mixture weight. In another embodiment, a target polymer content can be less than 8%. In another embodiment, a target polymer content can be more than 2%.

At step 710, a predicted mixture weight (predicted wet mixture weight) can be calculated. For example, the amount of rock base material determined at step 704 and the target moisture content determined at step 706 can be utilized to calculate the predicted mixture weight. For example, if the rock base material amount and/or weight is known, and it is also known what the moisture content should be to achieve the target moisture content, a predicted wet mixture weight can thereby be calculated.

At step 712, an amount of polymer can be determined. For example, the target polymer content determined at step 708 can be utilized with the predicted mixture weight calculated at step 710 to arrive at an amount of polymer. For example, if a predicted mixture weight is 13 pounds, and a target polymer content is 3%, it can be determined that 3% of the 13 pounds should be the amount of polymer.

At step 714, an amount of water can be determined. In one example, an amount of water be determined using amount of polymer and the target moisture content. For example, the amount of polymer can be included in a moisture content consideration—in other words, a moisture content can include polymer that provides fluid that can be considered moisture. In another embodiment, an amount of polymer can comprise a portion of the moisture content, and an amount of water can comprise the remainder of the moisture content not accounted for by the polymer. For example, and in one embodiment, if a target moisture content is 10% by weight of the wet unit mixture, and the amount of polymer determined at step 712 is 3% by weight of the wet unit mixture (which can, e.g., correspond to the target polymer content determined at step 708), 30% of the total moisture content can be accounted for by the polymer. In one embodiment, an amount of water can then be determined to be 7% by weight of the wet unit mixture, such that the entire moisture content can be 10% of the wet unit mixture. In another embodiment, the amount of water can be any amount necessary to add with the polymer to achieve the target moisture content.

At step 716, the amount of rock base material determined at step 704, the amount of polymer determined at step 712, and the amount of water determined at step 714 can be combined. In one embodiment, the amount of water and the amount of polymer can be combined first and subsequently added to the amount of rock base material. In another embodiment, the three components can be combined simultaneously. In another embodiment, a portion of a mixture of water and polymer can first be added (e.g., to a receptacle, such as receptacle 302 of mold 300 or to any other suitable receptacle), followed by a portion of the amount of rock base material, and the water, polymer, and rock base material can then be added alternately until the entire amounts of the materials are utilized. In another embodiment, the water, polymer, and rock base material can be combined in any order or manner suitable to facilitate the mixing of the materials, such as to, in one embodiment, form a substantially homogenous mixture.

At step 718, the combined materials from step 716 can be mixed together to form a unit mixture. In one embodiment, the unit mixture can be mixed until it is substantially homogenous. In another embodiment, the unit mixture can have a weight (wet mixture weight). The combination can be mixed in any suitable receptacle, such as a bucket, bowl, tough, or any other suitable receptacle. In another embodiment, the combination can be mixed in, e.g., a receptacle, such as receptacle 302 of mold 300. In another embodiment, steps 716 and 718 can be performed simultaneously.

At step 720, the mixture formed at step 718 can be molded. For example, the mixture can be applied to a receptacle of a mold (e.g., receptacle 302 of mold 300). In one embodiment, the mixture can be added such that it lays in the mold in a uniform fashion, such as to, e.g., facilitate molding of the mixture into a uniform shape.

At step 722, the mixture can be partially dried. In one embodiment, the mixture can be air dried, such as until the mixture is substantially solid, such that it can be removed from the mold. In another embodiment, the mixture can be dried in an oven or with any other suitable heat source.

At step 724, a glaze can be applied to the mixture. In one embodiment, the glaze can be a polymer (such as, e.g., the polymer utilized in the mixture), a ceramic glaze, or any other suitable glaze. In another embodiment, the glaze can be any material suitable to facilitate the sealing of the mixture, such as against moisture.

At step 726, the drying process can be completed to form a polymer masonry unit. For example, the mixture can be subjected to further air drying. In another embodiment, the partially dried mixture can be oven dried. In another embodiment, the mixture can be dried with a heat source. In another embodiment, the mixture can be dried without a heat source.

It will be understood by those having skill in the art that several methods are available to determine characteristics of given rock base material in accordance with the principles of the present disclosure. For example, a sieve analysis test can be used to determine a particle size distribution of a quarry byproduct. In another example, a Proctor compaction test can be used to determine an optimal moisture content (which can guide, e.g., a target moisture content) at which a given aggregate will become most dense and achieve its maximum dry density. In another embodiment, an Atterberg test can be utilized to determine liquid limits, plastic limits, plasticity indices, or any other suitable indices, measurements, or constants related to critical water contents of, e.g., a quarry byproduct.

In another embodiment, polymer masonry units in accordance with the principles of the present disclosure can withstand compression. For example, a unit can withstand, in one embodiment, up to 4000 PSI. In another embodiment, a polymer masonry unit in accordance with the principles of the present disclosure can withstand any amount of compression necessary to allow the unit to pass, for example, ASTM standards with respect to compression strength.

Persons skilled in the art will readily understand that the advantages and objectives disclosed herein would not be possible without the particular combination of structural components and mechanisms assembled in this inventive system and described above.

The Present Disclosure Achieves at Least the Following Advantages:
1. New use for quarry byproduct;
2. Construction unit whose manufacture is environmentally friendly;
3. Brick unit that does not require a kiln to cure; and
4. Recycles quarry byproduct into a construction unit capable of replacing traditional bricks.

The description in this patent document should not be read as implying that any particular element, step, or function can be an essential or critical element that must be included in the claim scope. Also, none of the claims can be intended to invoke 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," "processing device," or "controller" within a claim can be understood and intended to refer to structures known to those skilled in the relevant art, as further modified or enhanced by the features of the claims themselves, and can be not intended to invoke 35 U.S.C. § 112(f).

The disclosure may be embodied in other specific forms without departing from the spirit or essential characteristics thereof. For example, each of the new structures described herein, may be modified to suit particular local variations or requirements while retaining their basic configurations or structural relationships with each other or while performing the same or similar functions described herein. The present embodiments are therefore to be considered in all respects as illustrative and not restrictive. Accordingly, the scope of the inventions can be established by the appended claims rather than by the foregoing description. All changes which come within the meaning and range of equivalency of the claims are therefore intended to be embraced therein. Further, the individual elements of the claims are not well-understood, routine, or conventional. Instead, the claims are directed to the unconventional inventive concept described in the specification.

While the disclosure has described a number of embodiments, it is not thus limited and is susceptible to various changes and modifications without departing from the spirit thereof. Persons skilled in the art will understand that this concept is susceptible to various changes and modifications, and may be implemented or adapted readily to other types of environments. Further, the individual elements of the claims are not well-understood, routine, or conventional. Instead, the claims are directed to the unconventional inventive concept described in the specification.

What is claimed is:

1. A polymer masonry unit, comprising:
    a brick, including:
        a polymer, and
        calcium carbonate,
    wherein the polymer comprises more than 5% but less than 10% of a weight of the unit, and the calcium carbonate comprises more than 90% but less than 95% of the weight of the unit,
    wherein 5-15% of the calcium carbonate has a particle size of at least 4750 microns.

2. The polymer masonry unit of claim 1, wherein the brick further includes fiber elements to increase structural stability.

3. The polymer masonry unit of claim 1, wherein the polymer is an acrylic copolymer-based polymer.

4. The polymer masonry unit of claim 1, wherein 10-20% of the calcium carbonate has a particle size ranging from 2360 microns to 4750 microns.

5. The polymer masonry unit of claim 1, wherein 25-35% of the calcium carbonate has a particle size ranging from 600 microns to 2360 microns.

6. The polymer masonry unit of claim 1, wherein 30-40% of the calcium carbonate has a particle size ranging from 150 microns to 600 microns.

7. The polymer masonry unit of claim 1, wherein 1-10% of calcium carbonate has a particle size ranging from 75 microns to 150 microns.

8. The polymer masonry unit of claim 1, wherein the brick is formed using a mixture that includes:
    the polymer,
    the calcium carbonate, and
    an amount of water,
    wherein the amount of water in the brick is determined based on a target moisture content for the mixture.

9. The polymer masonry unit of claim 1, wherein the polymer masonry unit is cured without kiln firing.

10. The polymer masonry unit of claim 1, wherein when the polymer masonry unit is radiated, there are no emissions.

11. The polymer masonry unit of claim 1, wherein the polymer masonry unit's structural stability meets or exceeds that of natural limestone.

12. The polymer masonry unit of claim 1, wherein the polymer masonry unit is finished by applying a coat of the polymer to a surface of the polymer masonry unit.

13. The polymer masonry unit of claim 1, wherein the quarry byproduct is filtered to remove stone fragments larger than a threshold size.

* * * * *